(12) United States Patent
Sampigethaya et al.

(10) Patent No.: US 8,973,101 B1
(45) Date of Patent: Mar. 3, 2015

(54) METHOD AND APPARATUS FOR AUTHENTICATING INFORMATION RECEIVED AT AN AIRPORT SURFACE WIRELESS NODE

(75) Inventors: Radhakrishna G. Sampigethaya, Snoqualmie, WA (US); Mingyan Li, Redmond, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 13/450,108

(22) Filed: Apr. 18, 2012

(51) Int. Cl.
*H04L 29/06* (2006.01)

(52) U.S. Cl.
USPC .................................................. 726/4; 726/21

(58) Field of Classification Search
CPC ............................... H04L 63/107; H04L 63/10
USPC ...................................................... 726/4, 21
See application file for complete search history.

(56) References Cited

U.S. PATENT DOCUMENTS

| | | | |
|---|---|---|---|
| 7,450,004 | B2 | 11/2008 | Allen et al. |
| 2004/0028017 | A1* | 2/2004 | Whitehill et al. ............. 370/338 |
| 2006/0094417 | A1* | 5/2006 | Allen et al. .................... 455/423 |

OTHER PUBLICATIONS

Barry et al., "Airport Perimeter Security: Where we've been, Where we are, and Where we're going," 2008 IEEE Conference on Technologies for Homeland Security, May 2008, pp. 57-62.

Robinson et al., "Impact of Public Key Enabled Applications on the Operation and Maintenance of Commercial Airplanes," AIAA Aviation Technology Integration and Operations (ATIO) Conference, Sep. 2007, 10 Pages.

Srinivasan et al., "RSSI is Under Appreciated," Proceedings of the 3rd Workshop on Embedded Networked Sensors (EmNets), May 2006, 5 Pages.

* cited by examiner

*Primary Examiner* — Jeffrey Pwu
*Assistant Examiner* — Thong Truong
(74) *Attorney, Agent, or Firm* — Yee & Associates, P.C.

(57) ABSTRACT

A method and apparatus for authenticating a signal received at a wireless node. The signal is received at the wireless node. The wireless node is one of a plurality of wireless nodes in a communications network. A set of parameters is identified for the signal. A distance between the wireless node and a source of the signal is identified using a location of the wireless node and the set of parameters for the signal. A determination as to whether the source of the signal is an authorized source is made using the distance identified.

18 Claims, 5 Drawing Sheets

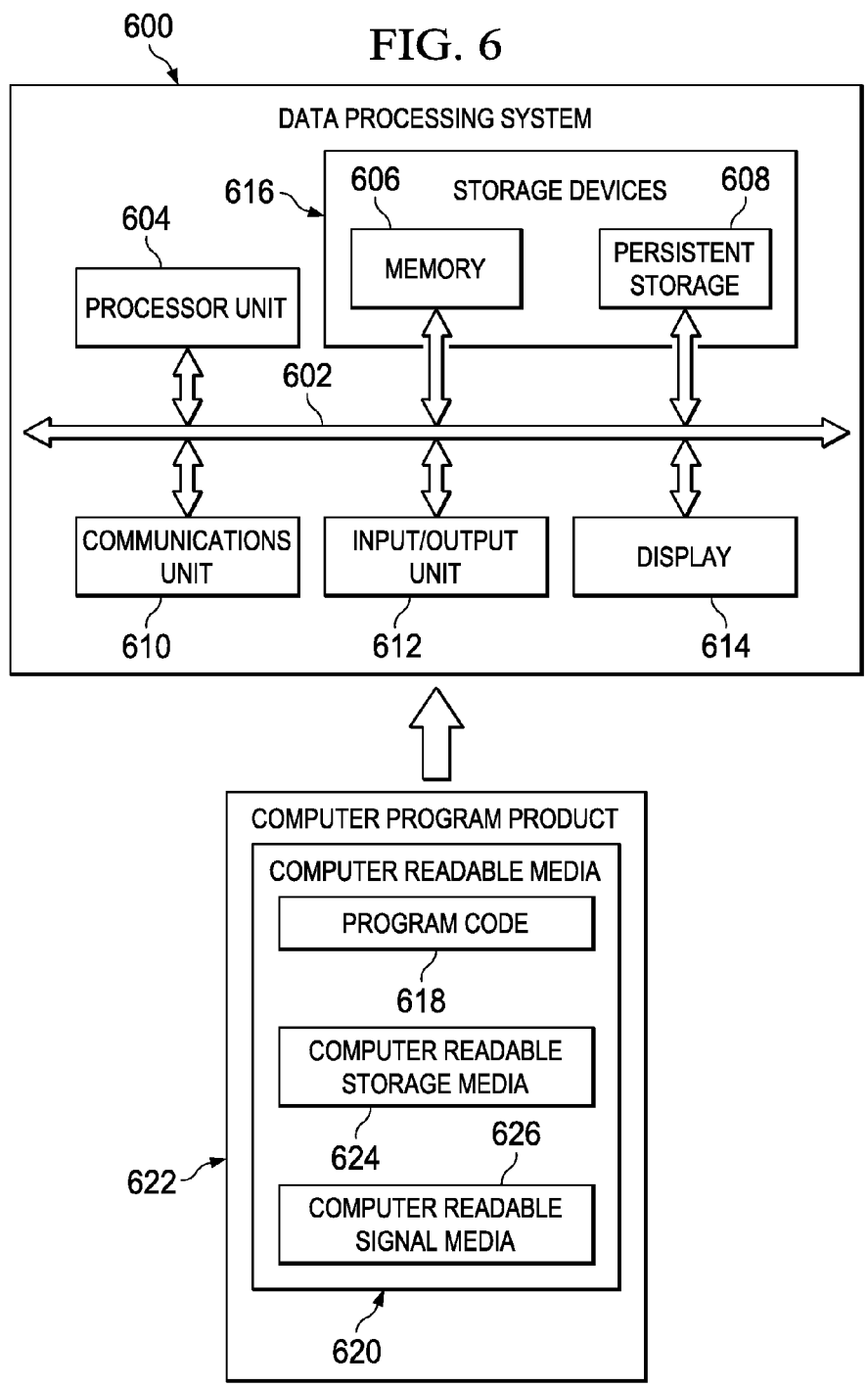

METHOD AND APPARATUS FOR AUTHENTICATING INFORMATION RECEIVED AT AN AIRPORT SURFACE WIRELESS NODE

BACKGROUND INFORMATION

1. Field

The present disclosure relates generally to wireless nodes, and in particular, to wireless nodes in an airport. Still more particularly, the present disclosure relates to a method and apparatus for authenticating information received at a wireless node in the airport.

2. Background

The operation of aircraft may be improved by improving communications between the aircraft and the ground stations at airports. As used herein, an "airport" is an area that includes runways, taxiways, control stations, hangars, terminals, maintenance buildings, cargo loading docks, ramps, passenger facilities, parking lots, the land around these structures, and/or other types of surfaces or structures for use by aircraft and/or the personnel involved in the operation of aircraft. These personnel may include, for example, without limitation, airline personnel, passengers, flight crews, maintenance crews, air traffic control operators, and/or other suitable types of operators.

Communications between an aircraft and different ground stations at an airport may be improved by increasing the speed at which information is exchanged between the aircraft and these ground stations and between the different ground stations. One currently available solution for increasing this speed uses a communications network that includes wireless nodes placed in different locations throughout the airport. These wireless nodes may allow communications between ground stations and communications between aircraft and ground stations. As used herein, a "wireless node" is a system configured to send information, receive information, or perform a combination of the two, wirelessly. These wireless nodes may be connected to a hard-wired network such as, for example, the Internet.

This type of arrangement of wireless nodes may be referred to as a "wi-fi" arrangement. At least a portion of these wireless nodes may be located outdoors but within the airport. For example, one or more of the wireless nodes may be located along runways, along taxiways, around terminals, around hangars, and in other types of outdoor locations at an airport. This type of arrangement of wireless nodes may allow an aircraft to send and/or receive information while taxiing at the airport, approaching the airport, departing the airport, and parked at a gate at the airport.

However, using wireless nodes for communications between aircraft and ground stations at an airport may introduce the possibility of an unauthorized system gaining access to the communications network and/or intentionally disrupting the communications network. The wireless nodes in the communications network may need a way of authenticating the information that is received at these wireless nodes. As used herein, "authenticating" information received at a wireless node means verifying that the source of the information is a valid source and not a potential threat to the communications network.

In some cases, a cryptographic system may be used to encrypt information being sent to a wireless node and decrypt the information received at the wireless node. However, a cryptographic system may be more expensive and/or require more resources than desired. For example, with a cryptographic system, digital certificates and digital keys may be used. Management of these digital certificates and digital keys may require more storage capacity, processing power, and/or other resources than desired.

Additionally, airport safety regulations, airport security policies, and potential interference with airport operations, may limit personnel from accessing wireless nodes located within the airport as frequently as desired to perform equipment maintenance, such as, for example, refreshing security data and/or cryptographic information in equipment. Therefore, it would be desirable to have a method and apparatus that takes into account at least some of the issues discussed above, as well as other possible issues.

SUMMARY

In one illustrative embodiment, a method for authenticating a signal received at a wireless node is provided. The signal is received at the wireless node. The wireless node is one of a plurality of wireless nodes in a communications network. A set of parameters is identified for the signal. A distance between the wireless node and a source of the signal is identified using a location of the wireless node and the set of parameters for the signal. A determination as to whether the source of the signal is an authorized source is made using the distance identified.

In another illustrative embodiment, a communications network comprises a wireless node and a group of in-range wireless nodes. The group of in-range wireless nodes is within a communications range for the wireless node. The wireless node is configured to receive a signal, identify a set of parameters for the signal, identify a distance between the wireless node and a source of the signal using a location of the node and the set of parameters for the signal, and determine whether the source of the signal is an authorized source using the distance identified.

In yet another illustrative embodiment, an airport communications system comprises a number of databases and a plurality of wireless nodes. A wireless node in the plurality of wireless nodes is configured to receive a signal. The wireless node is further configured to identify a set of parameters for the signal. The wireless node is further configured to identify a distance between the wireless node and a source of the signal using a location of the wireless node and the set of parameters for the signal. The wireless node is further configured to determine whether the distance between the wireless node and the source of the signal matches a known distance between the wireless node and one of a group of in-range wireless nodes in the plurality of wireless nodes within selected tolerances using a database in the number of databases to determine whether the source of the signal is an authorized source.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a data processing system in accordance with an illustrative embodiment.

DETAILED DESCRIPTION

The different illustrative embodiments recognize and take into account different considerations. For example, the different illustrative embodiments recognize and take into account that a wireless node that can authenticate information received at the wireless node may be desirable. In particular, the different illustrative embodiments recognize and take into account that it may be desirable to have a wireless node that can authenticate the information received at the wireless node without increasing the amount of resources needed or the cost for managing the communications network more than desired.

Thus, the different illustrative embodiments provide a method and apparatus for authenticating information received at a wireless node in a communications network. In particular, the different illustrative embodiments provide a method and apparatus for authenticating the signal carrying the information received at the wireless node in the communications network.

Figure 1:
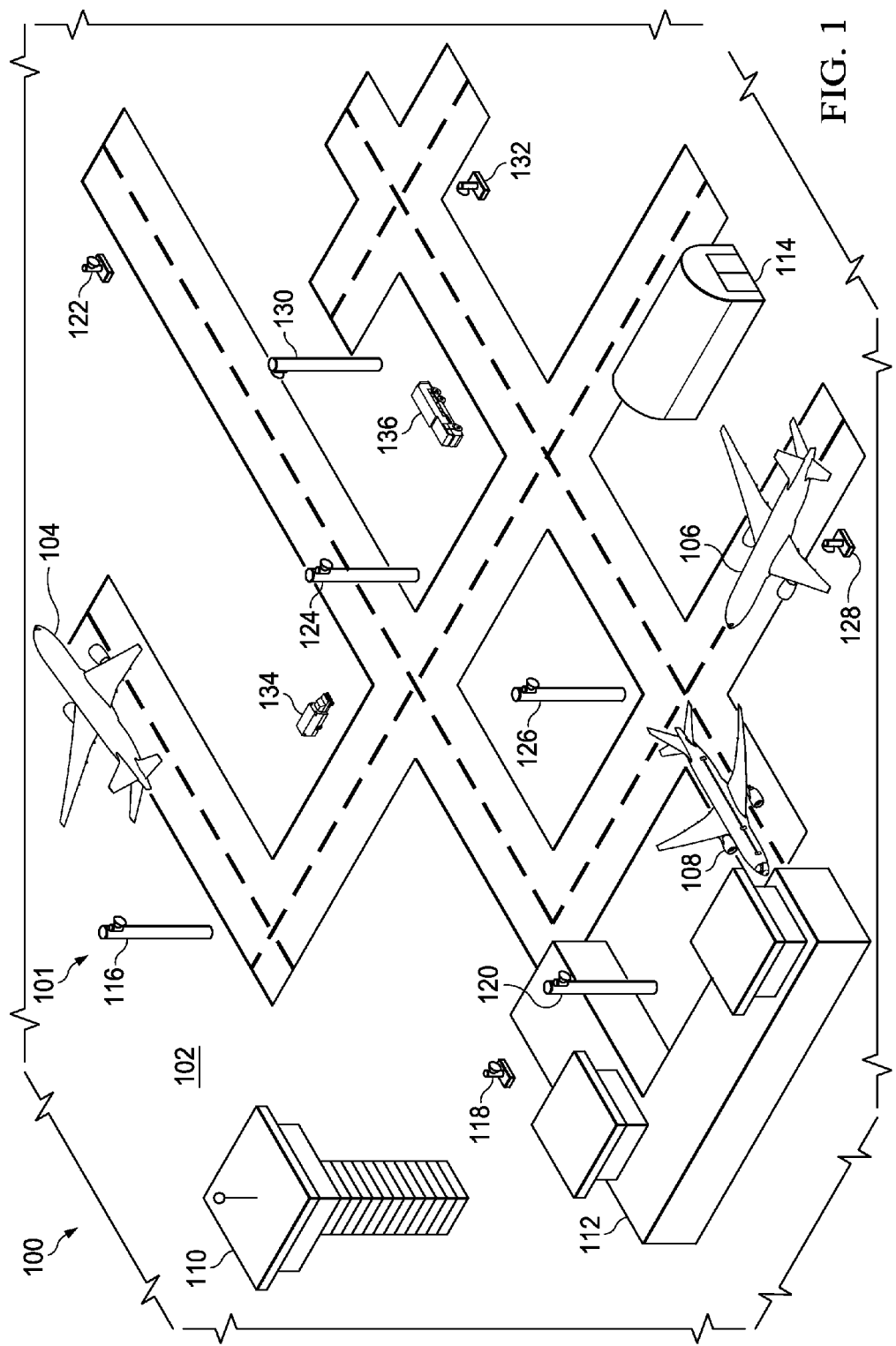
FIG. 1 is an illustration of a communications environment in accordance with an illustrative embodiment.

With reference now to FIG. 1, an illustration of a communications environment is depicted in accordance with an illustrative embodiment. In this illustrative example, communications environment 100 is an example of one environment in which communications network 101 may be implemented in accordance with an illustrative embodiment. As depicted, communications network 101 is implemented in airport 102 in communications environment 100 in accordance with an illustrative embodiment.

In this illustrative example, aircraft 104 is departing airport 102. Aircraft 106 is taxiing at airport 102. Further, aircraft 108 is parked at a gate at terminal 112 in airport 102. Aircraft 104, aircraft 106, and aircraft 108 use communications network 101 to communicate with ground stations in airport 102 such as, for example, air traffic control tower 110, terminal 112, and maintenance hangar 114.

In this illustrative example, communications network 101 includes wireless nodes 116, 118, 120, 122, 124, 126, 128, 130, 132, 134, and 136. Wireless nodes 116, 118, 120, 122, 124, 126, 128, 130, and 132 may be fixed nodes. In particular, these wireless nodes may be in fixed locations and may not move. However, wireless node 134 and wireless node 136 may be mobile nodes. As depicted, these wireless nodes are located on ground vehicles that allow the wireless nodes to be moved to different locations in airport 102.

The different wireless nodes in communications network 101 are configured to communicate with each other when these wireless nodes are within a communications range of each other. Further, each of these wireless nodes is configured to authenticate information received at that wireless node.

For example, wireless node 124 may authenticate information received at wireless node 124 by determining whether the information is received from one of wireless nodes 116, 118, 120, 122, 126, 128, 130, 132, 134, and 136. These wireless nodes in communications network 101 are authorized sources for information received at wireless node 124.

If the information is identified as being received from one of these wireless nodes, the information is authenticated. If the information is identified as not being from one of these wireless nodes, authentication of the information is denied. In this manner, wireless node 124 may be configured to determine when information received at wireless node 124 is from an authorized source or from an unauthorized source. This determination is used to authenticate information received at wireless node 124.

Figure 2:
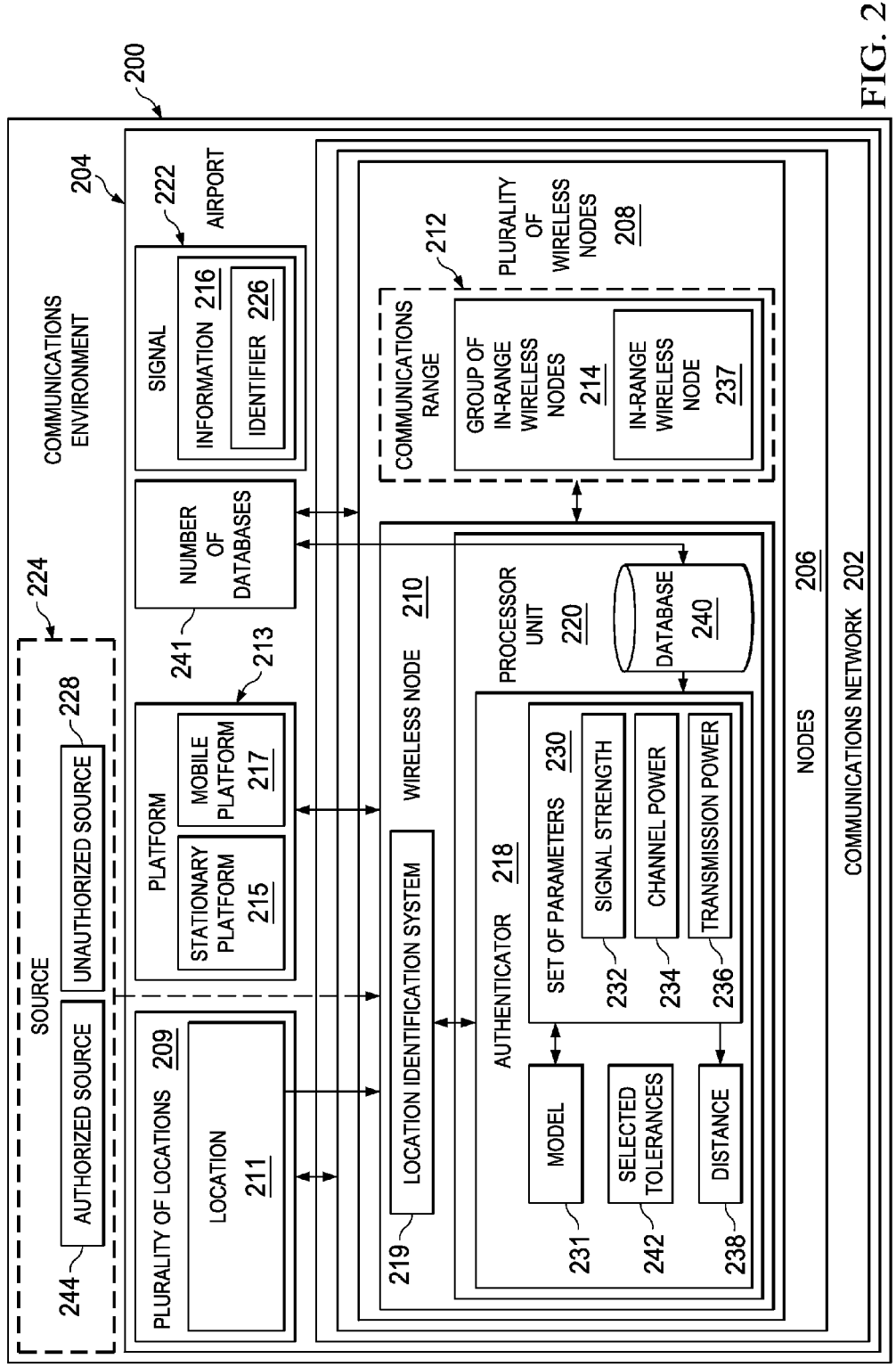
FIG. 2 is an illustration of a communications environment in the form of a block diagram in accordance with an illustrative embodiment.

With reference now to FIG. 2, an illustration of a communications environment in the form of a block diagram is depicted in accordance with an illustrative embodiment. Communications environment 100 in FIG. 1 is an example of one implementation for communications environment 200 in FIG. 2.

As depicted, communications network 202 may be implemented within airport 204 in one illustrative example. Airport 204 is an area that includes any number of runways, taxiways, control stations, hangars, terminals, maintenance buildings, docks, ramps, passenger facilities, parking lots, and/or other suitable types of surfaces and ground stations. Airport 102 in FIG. 1 is an example of one implementation for airport 204 in FIG. 2.

In these illustrative examples, communications network 202 comprises nodes 206. As used herein, a "node", such as a node in nodes 206, is a system configured to exchange information with another system. As used herein, "exchanging information", may include sending information, receiving information, or a combination of the two. In this manner, a node in nodes 206 may be configured to send information to another node, receive information from another node, or a combination of the two.

Nodes 206 may be distributed throughout airport 204 in various locations. In these illustrative examples, each node in nodes 206 may be located in a different location in airport 204. Of course, in other illustrative examples, two nodes may be located in a same area within airport 204.

In these illustrative examples, nodes 206 include plurality of wireless nodes 208. As used herein, a "plurality of" items means two or more items. For example, plurality of wireless nodes 208 includes two or more wireless nodes.

A "wireless node", as used herein, such as one of plurality of wireless nodes 208, is a system that is configured to exchange information with another system wirelessly. In other words, a wireless node is a system that can exchange information with another system that is not physically connected to the system. In some illustrative examples, the system may also be configured to exchange information with another system that is physically connected to the system. Wireless nodes 116, 118, 120, 122, 124, 126, 128, 130, and 132 in FIG. 1 are examples of one implementation for plurality of wireless nodes 208 in FIG. 2.

In these illustrative examples, plurality of wireless nodes 208 may be located in plurality of locations 209 in airport 204. Each wireless node in plurality of wireless nodes 208 is located in a corresponding location in plurality of locations 209 in these examples. One or more of plurality of wireless nodes 208 may be located outdoors in airport 204 in these examples.

Wireless node 210 is an example of one of plurality of wireless nodes 208. Wireless node 210 is located in location 211 in plurality of locations 209 in airport 204. Wireless node 210 may comprise, for example, without limitation, at least one of a transmitter, a receiver, a transceiver, an antenna, a radio communications device, an optical communications device, and some other suitable type of component.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other suitable combination.

Wireless node 210 may be associated with platform 213 in airport 204 in these illustrative examples. When one component is "associated" with another component, the association is a physical association in these depicted examples. For example, a first component, such as wireless node 210, may be considered to be associated with a second component, such as platform 213, by being secured to the second component, bonded to the second component, mounted to the second component, welded to the second component, fastened to the second component, and/or connected to the second component in some other suitable manner.

The first component also may be connected to the second component using a third component. The first component may also be considered to be associated with the second component by being formed as part of and/or an extension of the second component.

Platform 213 may take the form of stationary platform 215 or mobile platform 217. Stationary platform 215 is a platform that remains in a fixed location and does not move. Stationary platform 215 may be selected from one of, for example, without limitation, a pole, a building, a manmade structure, a bridge, a ramp, a curb, a light fixture, a tower, or some other suitable type of stationary platform in airport 204.

Mobile platform 217 is a platform that can move around airport 204. Mobile platform 217 may be selected from, for example, without limitation, a ground vehicle, a maintenance truck, an unmanned aerial vehicle, an unmanned ground vehicle, a wheeled structure, a structure that can be rolled, or some other suitable type of mobile platform 217.

When wireless node 210 is associated with stationary platform 215, location 211 of wireless node 210 remains fixed. When wireless node 210 is associated with mobile platform 217, location 211 of wireless node 210 may change.

As depicted, wireless node 210 may also be associated with location identification system 219 in some illustrative examples. Location identification system 219 is configured to identify location 211 of wireless node 210. Location identification system 219 may include any number of sensors and/or devices that may be used to identify location 211 of wireless node 210.

In one illustrative example, location identification system 219 comprises a global positioning system (GPS) unit configured to identify location 211 of wireless node 210. In another illustrative example, location identification system 219 may be configured to use information from aircraft flying into and/or out of airport 204 and/or information from ground stations in airport 204 to identify location 211 of wireless node 210. For example, the location identification system may use information from aircraft that are parked, flying into, or flying out of airport 204 to triangulate location 211 of wireless node 210.

In this manner, wireless node 210 may identify location 211 of wireless node 210 in a number of different ways. In some cases, wireless node 210 may receive an identification of location 211 at the time wireless node 210 is installed in location 211.

In these illustrative examples, the different wireless nodes in plurality of wireless nodes 208 are configured to communicate with each other. For example, wireless node 210 may send information to and/or receive information from another wireless node in plurality of wireless nodes 208 that is within communications range 212 of wireless node 210. Communications range 212 is the distance from wireless node 210 within which wireless communications are allowed. In other words, wireless node 210 may be unable to exchange information with a wireless node located outside of communications range 212.

As depicted, group of in-range wireless nodes 214 is the portion of plurality of wireless nodes 208 that are within communications range 212 of wireless node 210. Group of in-range wireless nodes 214 may be one or more wireless nodes in plurality of wireless nodes 208. In some cases, an in-range wireless node for wireless node 210 may be referred to as a wireless node that is within one "hop" of wireless node 210.

In these illustrative examples, each wireless node in plurality of wireless nodes 208 is configured to authenticate information received at that wireless node. As used herein, authenticating information received at the wireless node means authenticating the signal carrying the information received at the wireless node. The signal carrying the information is authenticated by verifying that the information received is from another wireless node in plurality of wireless nodes 208 within communications range of the wireless node. For example, wireless node 210 is configured to authenticate information 216 received at wireless node 210 by determining whether information 216 is from a wireless node in group of in-range wireless nodes 214.

In these illustrative examples, wireless node 210 is configured to authenticate information using authenticator 218. Authenticator 218 may be implemented using hardware, software, or a combination of the two. In one illustrative example, authenticator 218 is implemented in processor unit 220 in wireless node 210.

As one illustrative example, wireless node 210 receives information 216 in signal 222. Signal 222 may be a wireless signal selected from one of, for example, without limitation, an electromagnetic signal, a radio frequency (RF) signal, an optical signal, or some other suitable type of wireless signal.

In response to wireless node 210 receiving signal 222, authenticator 218 identifies source 224 of signal 222 using identifier 226 in information 216 in signal 222. Identifier 226 may be an identifier for source 224. Wireless node 210 may know the identifier for each wireless node in plurality of wireless nodes 208. If identifier 226 in information 216 in signal 222 does not match the identifier for any one of group of in-range wireless nodes 214, authenticator may identify that source 224 of signal 222 is an unauthorized source 228.

Unauthorized source 228 may be a potential threat to communications network 202. When source 224 is identified as unauthorized source 228, information 216 in signal 222 is not authenticated and wireless node 210 does not process information 216.

However, if identifier 226 does match the identifier for a wireless node in group in-range wireless nodes 214, authenticator 218 identifies set of parameters 230 for signal 222. As used herein, a "set of" items means one or more items. For example, set of parameters 230 means one or more parameters. In one illustrative example, set of parameters 230 may include at least one of signal strength 232, channel power 234, transmission power 236, and some other suitable type of parameter for signal 222.

When signal 222 is a radio frequency signal, signal strength 232 is a received signal strength indicator (RSSI) for the radio frequency signal. Further, when signal 222 is a radio frequency signal, channel power 234 is a received channel power indicator (RCPI) for the radio frequency signal. Transmission power 236 is the power with which source 224 of signal 222 sends signal 222.

As one illustrative example, authenticator 218 may determine that identifier 226 matches an identifier for in-range wireless node 237 in group of in-range wireless nodes 214. Authenticator 218 uses location 211 of wireless node 210 to identify model 231. Model 231 is a mathematical model in this illustrative example. Authenticator 218 uses model 231 to, for example, without limitation, identify signal propagation around location 211.

Authenticator 218 may use set of parameters 230 and model 231 to identify distance 238 between wireless node 210 and source 224 of signal 222. In particular, authenticator 218 may compute distance 238 using set of parameters 230 and model 231. In some cases, authenticator 218 may use one set of attenuation parameters for the overall environment in airport 204 to identify distance 238.

For example, operation of different stationary platforms and different mobile platforms at airport 204 may affect communications network 202. In particular, communications network 202 may be subject to factors such as, for example, different types of signal interference, multiple signals crossing paths, and fading effects, that may cause signals to be attenuated differently in different areas of airport 204. In this manner, a varying signal attenuation model for airport 204 in addition to location 211 may be useful in identifying distance 238.

Authenticator 218 determines whether source 224 of signal 222 is in-range wireless node 237 in group of in-range wireless nodes 214 for signal 222 using distance 238 and database 240. Database 240 stores information identifying plurality of locations 209 for plurality of wireless nodes 208. In some cases, database 240 identifies a known distance between wireless node 210 and each of plurality of wireless nodes 208 based on plurality of locations 209.

Authenticator 218 uses database 240 to determine whether distance 238 matches a known distance between wireless node 210 and in-range wireless node 237 within selected tolerances 242. Selected tolerances 242 may be computed using, for example, without limitation, model 231 and location 211 of authenticator 218 in wireless node 210.

If authenticator 218 determines that distance 238 between wireless node 210 and source 224 of signal 222 matches a known distance between wireless node 210 and in-range wireless node 237 within selected tolerances 242, authenticator 218 identifies source 224 as authorized source 244. Once source 224 is identified as authorized source 244, information 216 is authenticated and wireless node 210 may process information 216 carried in signal 222. This type of authentication may be referred to as a "single-hop authentication" in some illustrative examples.

Wireless node 210 may process information 216 in a number of different ways. For example, wireless node 210 may send information 216 to another wireless node in group of in-range wireless nodes 214, send information 216 to a ground station in airport 204, and/or perform other suitable operations using information 216. Information 216 processed by wireless node 210 may include, for example, without limitation, at least one of a message, a request, a command, data, diagnostic data, sensor measurements, and other suitable types of information.

In other illustrative examples, information 216 may include embedded security data that enables higher network layers of the wireless node, for example, without limitation, to additionally authenticate messages in information 216. These higher network layers may be layers above a physical layer for communications network 202.

If authenticator 218 determines that distance 238 does not match the known distance between wireless node 210 and in-range wireless node 237 within selected tolerances 242, authenticator 218 identifies source 224 as unauthorized source 228. In one illustrative example, wireless node 210 generates one or more alerts in response to identifying source 224 as unauthorized source 228. Wireless node 210 may send these alerts to one or more wireless nodes in plurality of wireless nodes 208 and/or to a control station in airport 204.

In this manner, wireless node 210 is configured to use location 211 of wireless node 210, database 240, and distance 238 to authenticate information 216 received in signal 222. Further, authenticator 218 may authenticate information 216 in signal 222 without requiring the use of encryption and/or decryption methods, digital certificates, and/or digital keys. Consequently, authenticator 218 may authenticate information 216 in a manner that is less expensive and requires fewer resources than cryptographic methods for authenticating information.

In these illustrative examples, database 240 used by authenticator 218 in wireless node 210 may be formed in a number of different ways. In one illustrative example, database 240 may be uploaded to wireless node 210 at the time of installation of wireless node 210 in location 211. In another illustrative example, wireless node 210 may create and update database 240 using information received from other wireless nodes in plurality of wireless nodes 208.

In some cases, wireless node 210 may update database 240 with the locations of wireless nodes in plurality of wireless nodes 208 using firmware updates received at wireless node 210. In other illustrative examples, each wireless node in plurality of wireless nodes 208 may identify the location of that wireless node and send a message to other wireless nodes in plurality of wireless nodes 208 with the location. Wireless node 210 may use these messages to create and update database 240.

In some illustrative examples, database 240 may be a database in number of databases 241. As used herein, a "number of" items means one or more items. For example, number of databases 241 means one or more databases. In one illustrative example, each wireless node in plurality of wireless nodes 208 may have a corresponding database in number of databases 241.

In another illustrative example, number of databases 241 may be in locations remote to plurality of wireless nodes 208. For example, each database in number of databases 241 may be located in a processor unit that is not part of a wireless node in plurality of wireless nodes 208. In some cases, multiple wireless nodes in plurality of wireless nodes 208 may share access to a database. For example, wireless node 210 and one or more other wireless nodes in plurality of wireless nodes 208 may all be capable of retrieving information from database 240.

In some illustrative examples, information 216 in signal 222 may not include identifier 226 for source 224. Authenticator 218 may identify distance 238 between wireless node 210 and source 224 using set of parameters 230 and location 211 of wireless node 210 without knowing identifier 226.

Depending on the implementation, source 224 may not be the original sender of information 216. For example, in some cases, source 224 may be forwarding a message in information 216 to wireless node 210 in which the message was received from another wireless node located outside of communications range 212 for wireless node 210.

In one illustrative example, the message may be sent from a primary wireless node in plurality of wireless nodes 208 through one or more different wireless nodes in plurality of wireless nodes 208 to source 224. Source 224 then sends this message to wireless node 210. Each of these different wireless nodes may be configured to authenticate the message received at the wireless node in a manner similar to the manner in which wireless node 210 is configured to authenticate information 216.

Consequently, by authenticating the message at each wireless node at which the message is received, the primary wireless node that generated the original message may also be authenticated. In other words, by the time the message is received at wireless node 210 and wireless node 210 authenticates the message received from source 224, the primary wireless node that originated the message is authenticated. This type of authentication may be referred to as "multi-hop authentication" in some illustrative examples.

Figure 3:
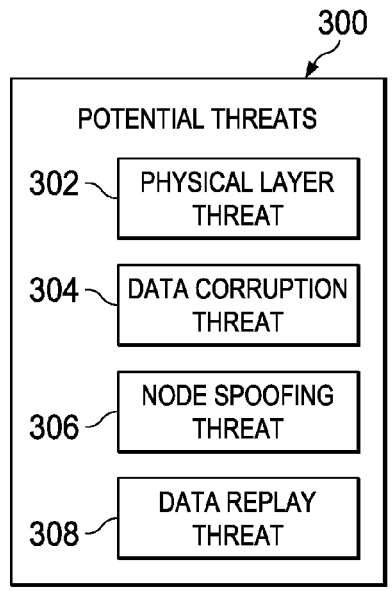
FIG. 3 is an illustration of potential threats to a communications network in the form of a block diagram in accordance with an illustrative embodiment.

With reference now to FIG. 3, an illustration of potential threats to a communications network in the form of a block diagram is depicted in accordance with an illustrative embodiment. In this illustrative example, potential threats 300 are examples of possible threats to communications network 202 in FIG. 2. As depicted, potential threats 300 include physical layer threat 302, data corruption threat 304, node spoofing threat 306, and data replay threat 308. Of course, in other illustrative examples, other potential threats may be present for communications network 202 in FIG. 2.

Physical layer threat 302 is the threat of an unauthorized source, such as unauthorized source 228 in FIG. 2, introducing transmissions into the physical layer of communications network 202 in FIG. 2 to corrupt one or more binary digits, or bits, in the wireless communications between the wireless nodes in plurality of wireless nodes 208 in FIG. 2. Data corruption threat 304 is the threat of unauthorized source 228 in FIG. 2 using a random identifier and attempting to send corrupt messages to a wireless node in plurality of wireless nodes 208 in FIG. 2.

Node spoofing threat 306 is the threat of unauthorized source 228 in FIG. 2 spoofing the identify of a wireless node in plurality of wireless nodes 208 in FIG. 2 and introducing corrupt data into the wireless communications between wireless nodes in plurality of wireless nodes 208. As used herein, "spoofing" means imitating. For example, unauthorized source 228 in FIG. 2 may imitate the identify of wireless node 210 in FIG. 2 by using the identifier for wireless node 210 when sending a corrupt message to another wireless node in plurality of wireless nodes 208 in FIG. 2.

Data replay threat 308 is the threat of unauthorized source 228 in FIG. 2 resending information to a particular wireless node in plurality of wireless nodes 208 that was previously sent from another wireless node to the particular wireless node. The information may include a valid identifier for the other node that previously sent the information to the particular wireless node. Further, the information may be information that was valid. However, the information may be outdated. In one illustrative example, this type of threat may be an issue when, for example, unauthorized source 228 attempts to send outdated diagnostic data about a wireless node in plurality of wireless nodes 208 to another wireless node in plurality of wireless nodes 208.

The likelihood of one or more of potential threats 300 occurring may be reduced using an authenticator, such as authenticator 218 in FIG. 2, at each of the wireless nodes in plurality of wireless nodes 208 in FIG. 2. Authenticator 218 allows information to be authenticated based on parameters for the signal carrying the information instead of the contents of the information.

The illustrations of communications environment 200 in FIG. 2 and potential threats 300 in FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, wireless node 210 may be configured to receive a distance measurement from one or more wireless nodes in plurality of wireless nodes 208. This distance measurement may be a distance between a wireless node in plurality of wireless nodes 208 and source 224, as identified by the wireless node in plurality of wireless nodes 208. Wireless node 210 may use the different distance measurements from the wireless nodes in plurality of wireless nodes 208 to refine distance 238 identified between wireless node 210 and source 224.

In other words, wireless node 210 may use these distance measurements to more accurately identify distance 238 between wireless node 210 and source 224. In particular, wireless node 210 may use these distance measurements to refine distance 238 when, for example, without limitation, distance 238 is close to within selected tolerances 242 or when location 211 of wireless node 210 requires a higher level of confidence in the computation for distance 238.

In some illustrative examples, wireless node 210 may comprise three synchronized global positioning system receivers. Each of these receivers may be configured to record a time of arrival for signal 222. These times of arrival may then be used to identify a location of source 224 based on a time difference of arrival for signal 222.

In other illustrative examples, wireless node 210 may include additional devices configured to provide additional measurements of distance between wireless node 210 and source 224. For example, without limitation, source 224 may have an ultrasound signal transponder and may simultaneously transmit signal 222 and an ultrasonic signal to wireless node 210. Wireless node 210 identifies the difference between the time of arrival for signal 222 and time of arrival for the ultrasound signal. Wireless node 210 then identifies distance 238 using this time difference multiplied by the speed of sound. This type of computation results in distance 238 having a higher level of confidence.

Figure 4:
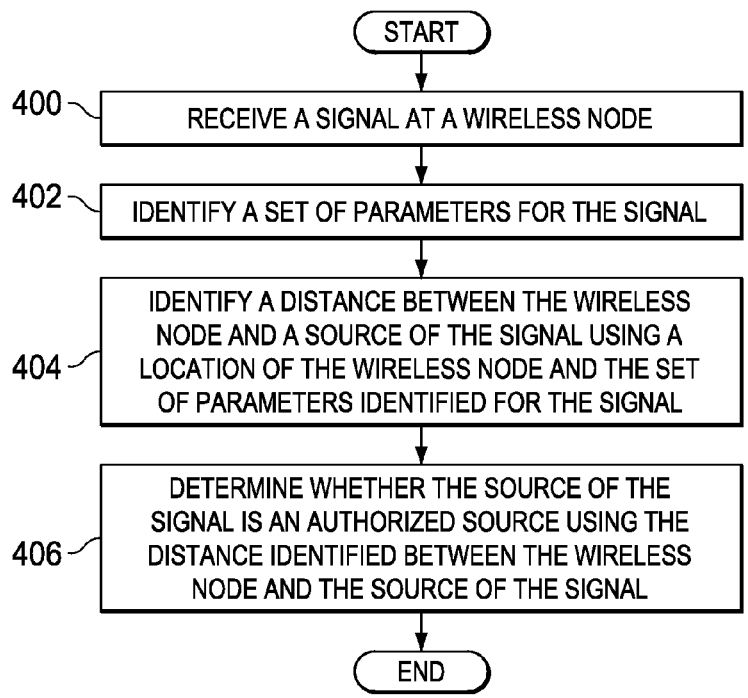
FIG. 4 is an illustration of a process for authenticating information received at a wireless node in a communications network in accordance with an illustrative embodiment.

With reference now to FIG. 4, an illustration of a process for authenticating information received at a wireless node in a communications network is depicted in accordance with an illustrative embodiment. The process illustrated in FIG. 4 may be implemented using wireless node 210 in FIG. 2, and in particular, authenticator 218 in FIG. 2.

The process begins by receiving a signal at a wireless node (operation 400). The wireless node is one of a plurality of wireless nodes in a communications network. The signal may be, for example, signal 222 in FIG. 2. The signal carries information that may include, for example, a message, a request, a command, data, diagnostic data, sensor measurements, and/or other suitable types of information. The process then identifies a set of parameters for the signal (operation 402). In operation 402, this set of parameters may include at least one of signal strength, channel power, and transmission power.

The process then identifies a distance between the wireless node and a source of the signal using a location of the wireless node and the set of parameters identified for the signal (operation 404). In some cases, in operation 404, the process may also use a signal propagation model and/or attenuation parameters for the overall environment in the airport to identify the distance between the wireless node and the source of the signal.

Thereafter, the process determines whether the source of the signal is an authorized source using the distance identified between the wireless node and the source of the signal (operation 406), with the process terminating thereafter. In operation 406, the process may determine that the source is an authorized source when the distance identified between the wireless node and the source of the signal matches a distance between the wireless node and another wireless node in the communications network within selected tolerances.

Figure 5:
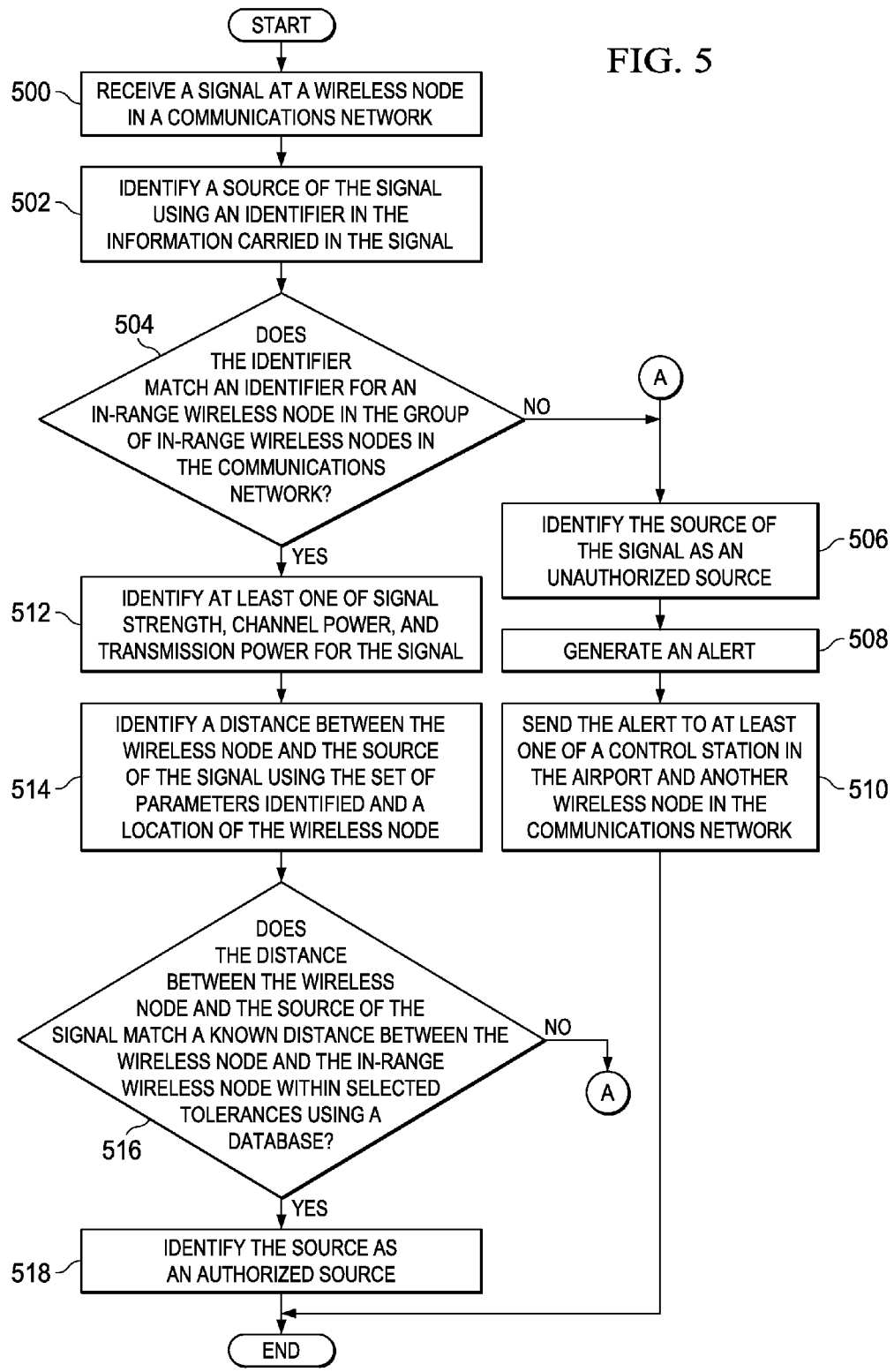
FIG. 5 is an illustration of a process for authenticating information received at a wireless node in a communications network in accordance with an illustrative embodiment.

With reference now to FIG. 5, an illustration of a process for authenticating information received at a wireless node in a communications network is depicted in accordance with an illustrative embodiment. The process illustrated in FIG. 5 may be implemented using wireless node 210 in FIG. 2, and in particular, authenticator 218 in FIG. 2. The process illustrated in FIG. 5 may be a more detailed process of the process described in FIG. 4.

The process begins by the wireless node receiving a signal at a wireless node in a communications network (operation 500). The wireless node may be one in a plurality of wireless nodes in the communications network. Further, the wireless node is configured to exchange information with other wireless nodes within a communications range for the wireless node. For example, the wireless nodes in the communications network that are within the communications range for the wireless node may form a group of in-range wireless nodes.

The wireless node then identifies a source of the signal using an identifier in the information carried in the signal (operation 502). Thereafter, the wireless node determines whether the identifier matches an identifier for an in-range wireless node in the group of in-range wireless nodes in the communications network (operation 504).

If the identifier does not match the identifier for an in-range wireless node in the group of in-range wireless nodes, the wireless node identifies the source of the signal as an unauthorized source (operation 506). Once the source of the signal is identified as an unauthorized source, the information carried in the signal is not processed.

The wireless node then generates an alert (operation 508). Next, the wireless node sends the alert to at least one of a control station in the airport and another wireless node in the communications network (operation 510), with the process terminating thereafter.

With reference again to operation 504, if the identifier matches the identifier for an in-range-wireless node in the group of in-range wireless nodes, the wireless node identifies at least one of signal strength, channel power, and transmission power for the signal (operation 512). When the signal is a radio frequency signal, the signal strength is a received signal strength indicator and the channel power is a received channel power indicator.

Thereafter, the wireless node identifies a distance between the wireless node and the source of the signal using the set of parameters identified and a location of the wireless node (operation 514). The wireless node then determines whether the distance between the wireless node and the source of the signal matches a known distance between the wireless node and the in-range wireless node within selected tolerances using a database (operation 516). The database identifies the locations of all of the wireless nodes in the communications network.

If the distance between the wireless node and the source of the signal does not match the distance between the wireless node and the in-range wireless node within selected tolerances, the process proceeds to operation 506 as described above. Otherwise, the wireless node identifies the source as an authorized source (operation 518), with the process terminating thereafter. Once the source of the signal is verified as an authorized source, the wireless node may process the information carried in the signal.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 6, an illustration of a data processing system is depicted in accordance with an illustrative embodiment. In this illustrative example, data processing system 600 may be used to implement processor unit 220 in FIG. 2. In this illustrative example, data processing system 600 includes communications framework 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for the data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications framework 602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 606 or a cache, such as that found in an interface and memory controller hub that may be present in communications framework 602.

Thus, the different illustrative embodiments provide a method and communications network for authenticating information received at a wireless node in a communications network by verifying the source of the signal in which the information is received. In one illustrative embodiment, a method for authenticating a signal received at a wireless node is provided. The signal is received at the wireless node. The wireless node is one of a plurality of wireless nodes in a communications network. A set of parameters is identified for the signal. A distance between the wireless node and a source of the signal is identified using a location of the wireless node and the set of parameters for the signal. A determination as to whether the source of the signal is an authorized source is made using the distance identified. If the source is an authorized source, the signal is considered authenticated as is the information carried in the signal.

In particular, the communications network of wireless nodes provided by the different illustrative embodiments may be configured such that each wireless node in the communications network can authenticate information received at the wireless node. Each wireless node may be configured to authenticate information received at the wireless node without increasing the amount of resources needed and/or the cost for managing the communications network more than desired.

For example, the authenticator in each wireless node in the communications network provided by the different illustrative embodiments may be configured to authenticate information without requiring a digital certificate or a digital key, without needing to decrypt the information, and without using other types of cryptographic methods. In this manner, the exchange of information between the different wireless nodes in the communications network may be simplified relative to methods for exchanging information that use cryptographic techniques. However, the exchange of information between the different wireless nodes in the communications network may maintain a desired level of security.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for authenticating a signal received at a wireless node, the method comprising:
   receiving the signal at the wireless node, wherein the wireless node is one of a plurality of wireless nodes in a communications network;
   identifying a set of parameters for the signal;
   identifying a distance between the wireless node and a source of the signal using a location of the wireless node and the set of parameters for the signal; and
   determining whether the source of the signal is an authorized source using the distance identified;
   wherein the step of determining whether the source of the signal is the authorized source using the distance identified comprises:
      determining whether the distance between the wireless node and the source of the signal matches a known distance between the wireless node and one of a group of in-range wireless nodes in the plurality of wireless nodes in the communications network within selected tolerances using a database; and
   wherein the selected tolerances are computed using a model and a location of an authenticator in the wireless node.

2. The method of claim 1 further comprising:
   responsive to a determination that the distance between the wireless node and the source of the signal matches the known distance between the wireless node and an in-range wireless node in the group of in-range wireless nodes within the selected tolerances, identifying the source of the signal as the authorized source.

3. The method of claim 2 further comprising:
   processing information carried in the signal in response to identifying the source of the signal as the authorized source.

4. The method of claim 1 further comprising:
   responsive to a determination that the distance between the wireless node and the source of the signal does not match the known distance between the wireless node and an in-range wireless node in the group of in-range wireless nodes within the selected tolerances, identifying the source of the signal as an unauthorized source.

5. The method of claim 4 further comprising:
   generating an alert in response to identifying the source of the signal as the unauthorized source; and
   sending the alert to at least one of another wireless node in the plurality of wireless nodes in the communications network and a control station.

6. The method of claim 1, wherein the step of identifying the set of parameters for the signal comprises:
   identifying the set of parameters for the signal, wherein the set of parameters includes at least one of signal strength, channel power, and transmission power.

7. The method of claim 1 further comprising:
   identifying the source of the signal using an identifier in information carried in the signal; and
   determining whether the identifier of the source of the signal matches a known identifier for another wireless node in the plurality of wireless nodes in the communications network, wherein the step of determining whether the source of the signal is the authorized source using the distance identified is performed in response to a determination that the identifier of the source of the signal matches the known identifier for the another wireless node in the plurality of wireless nodes in the communications network.

8. The method of claim 1, wherein the signal is a wireless signal selected from one of a radio frequency signal, an electromagnetic signal, and an optical signal and wherein the communications network is implemented in an airport and the plurality of wireless nodes is distributed in a plurality of locations throughout the airport.

9. A communications network comprising:
a group of in-range wireless nodes within a communications range for a wireless node;
the wireless node, wherein the wireless node is configured to:
receive a signal;
identify a set of parameters for the signal;
identify a distance between the wireless node and a source of the signal using a location of the wireless node and the set of parameters for the signal; and
determine whether the source of the signal is an authorized source using the distance identified; and
a database, wherein the wireless node is configured to determine whether the source of the signal is the authorized source using the distance identified by determining whether the distance between the wireless node and the source of the signal matches a known distance between the wireless node and one of the group of in-range wireless nodes in the communications network within selected tolerances using the database;
wherein the selected tolerances are computed using a model and a location of an authenticator in the wireless node.

10. The communications network of claim 9, wherein the wireless node is further configured to identify the source of the signal as the authorized source in response to a determination that the distance between the wireless node and the source of the signal matches the known distance between the wireless node and an in-range wireless node in the group of in-range wireless nodes within the selected tolerances.

11. The communications network of claim 10, wherein the wireless node is further configured to process information carried in the signal in response to identifying the source of the signal as the authorized source.

12. The communications network of claim 9, wherein the wireless node is further configured to identify the source of the signal as an unauthorized source in response to a determination that the distance between the wireless node and the source of the signal does not match the known distance between the wireless node and an in-range wireless node in the group of in-range wireless nodes within the selected tolerances.

13. The communications network of claim 12, wherein the wireless node is further configured to generate an alert in response to identifying the source of the signal as the unauthorized source and send the alert to at least one of another wireless node in the communications network and a control station.

14. The communications network of claim 9, wherein the set of parameters for the signal includes at least one of signal strength, channel power, and transmission power.

15. The communications network of claim 9, wherein the signal is a radio frequency signal and the set of parameters includes at least one of a received signal strength indicator, a received channel power indicator, and transmission power.

16. The communications network of claim 9, wherein the communications network is implemented in an airport and wherein the wireless node and the group of in-range wireless nodes are part of a plurality of wireless nodes that form the communications network in which the plurality of wireless nodes is distributed in a plurality of locations throughout the airport.

17. The communications network of claim 9, wherein the signal carries information comprising at least one of a message, a request, a command, data, diagnostic data, sensor measurements, and an identifier for the source of the signal.

18. An airport communications system comprising:
a number of databases; and
a plurality of wireless nodes, wherein a wireless node in the plurality of wireless nodes is configured to:
receive a signal;
identify a set of parameters for the signal;
identify a distance between the wireless node and a source of the signal using a location of the wireless node and the set of parameters for the signal; and
determine whether the distance between the wireless node and the source of the signal matches a known distance between the wireless node and one of a group of in-range wireless nodes in the plurality of wireless nodes within selected tolerances using a database in the number of databases to determine whether the source of the signal is an authorized source;
wherein the selected tolerances are computed using a model and a location of an authenticator in the wireless node.

* * * * *